(12) United States Patent
Abdul Jabbar et al.

(10) Patent No.: US 11,495,860 B2
(45) Date of Patent: Nov. 8, 2022

(54) SUPERCAPACITOR HOUSING FOR BATTERY PACKS

(71) Applicant: Nissan North America, Inc., Franklin, TN (US)

(72) Inventors: Mohammed Hussain Abdul Jabbar, Farmington Hills, MI (US); Takafumi Fukumoto, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 194 days.

(21) Appl. No.: 17/085,629

(22) Filed: Oct. 30, 2020

(65) Prior Publication Data

US 2022/0140299 A1 May 5, 2022

(51) Int. Cl.
*H01M 50/20* (2021.01)
*H01M 4/02* (2006.01)
*H01M 50/116* (2021.01)
*H01M 50/124* (2021.01)

(52) U.S. Cl.
CPC ............ *H01M 50/20* (2021.01); *H01M 4/02* (2013.01); *H01M 50/116* (2021.01); *H01M 50/124* (2021.01); *H01M 2004/027* (2013.01); *H01M 2004/028* (2013.01); *H01M 2220/20* (2013.01)

(58) Field of Classification Search
CPC .. H01M 50/20; H01M 50/124; H01M 50/116; H01M 4/02; H01M 2004/027; H01M 2004/028; H01M 2220/20
See application file for complete search history.

(56) References Cited

U.S. PATENT DOCUMENTS 7,529,076 B2   5/2009   Saito et al.

OTHER PUBLICATIONS

Special Considerations for Repairing Hybrid and Electric Vehicles; McCluskey Chevrolet website; retrieved Oct. 2020; 5 pages; https://www.mccluskeychevrolet.com/special-considerations-for-repairing-hybrid-and-electric-vehicles/.

*Primary Examiner* — Jane J Rhee
(74) *Attorney, Agent, or Firm* — Young Basile Hanlon & MacFarlane, P.C.

(57) ABSTRACT

A battery housing is configured to encase multiple battery cells comprises a supercapacitor shell. The supercapacitor shell comprises two layers each of carbon fiber reinforced with plastic; an electrode between the two layers, the electrode comprising negative electrode material, positive electrode material, and an electrolyte; a positive electrode terminal connected to the carbon fiber of one of the two layers; and a negative electrode terminal connected to the carbon fiber of another of the two layers. Edges of the two layers are laminated together to contain the electrode with the positive electrode terminal and the negative electrode terminal extending external to the laminated edges.

20 Claims, 6 Drawing Sheets

SUPERCAPACITOR HOUSING FOR BATTERY PACKS

TECHNICAL FIELD

This disclosure relates to housings for battery packs, and in particular, to housings made at least in part from a supercapacitor structure.

BACKGROUND

Battery packs include multiple battery unit cells in a housing, the number of battery unit cells determined to provide the necessary energy required to operate hybrid vehicles, electric vehicles and consumer products, as examples. The housing design of the battery pack is based in part on 1) keeping the volume of the battery pack as small as possible to accommodate the limited space in vehicles and other products; 2) providing mechanical protection of the battery unit cells; 3) providing measures to improve the safety of the battery unit cells; and 4) providing thermal management for efficient operation of the battery unit cells. The housing of the battery pack is conventionally aluminum or stainless steel. Aluminum is lighter weight but is typically more expensive than stainless steel, which is heavier but more cost effective.

SUMMARY

Disclosed herein are implementations of a housing for a battery pack that incorporates a supercapacitor shell, battery packs that incorporate the housing implementations disclosed herein, and a battery pack assembly that incorporates multiple battery packs with a frame as disclosed herein.

An implementation of a battery housing configured to encase multiple battery cells is formed at least in part from a supercapacitor shell. The supercapacitor shell comprises two layers each of carbon fiber reinforced with plastic; an electrode between the two layers, the electrode comprising negative electrode material, positive electrode material, and an electrolyte; a positive electrode terminal connected to the carbon fiber of one of the two layers; and a negative electrode terminal connected to the carbon fiber of another of the two layers. Edges of the two layers are laminated together to contain the electrode with the positive electrode terminal and the negative electrode terminal extending external to the laminated edges.

As disclosed herein, an implementation of a battery pack comprises multiple battery cells and a battery housing encasing the battery cells, the battery housing comprising six walls. At least one wall is formed of a supercapacitor shell. The supercapacitor shell comprises two layers, each layer of carbon fiber reinforced with plastic, with an electrode between the two layers, a positive electrode terminal connected to the carbon fiber of one of the two layers, and a negative electrode terminal connected to the carbon fiber of another of the two layers. The electrode comprises negative electrode material, positive electrode material, and an electrolyte. Edges of the two layers are laminated together to contain the electrode with the positive electrode terminal and the negative electrode terminal extending external to the laminated edges.

As disclosed herein, a battery pack assembly comprises multiple battery packs as disclosed herein having a battery housing that incorporates the supercapacitor shell, a frame configured to hold the multiple battery packs, the frame comprising internal supports between adjacent battery packs and external supports connected the internal supports and configured to surround the multiple battery packs along exterior side walls of the multiple battery packs; and wiring connected to the positive electrode terminal and the negative electrode terminal of each battery pack to consolidate power generated by each battery pack, the wiring supported by the frame.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

As required, a detailed description of the embodiments is disclosed herein. However, it is to be understood that the disclosed embodiments are merely exemplary of the invention that may be embodied in various and alternative forms. Therefore, specific structural and functional details disclosed herein are not to be interpreted as limiting, but merely as a representative basis for teaching one skilled in the art to variously employ the present invention.

Battery packs include multiple battery unit cells in a housing. The number of battery unit cells can be in the hundreds for certain applications, such as electric vehicles. Much effort has been put into reducing the size and weight of the individual unit cells while maintaining performance. The housing design of the battery pack is also designed to keep the size of the battery pack as small as possible and the weight of the battery pack as light as possible, while providing thermal management of the battery unit cells and mechanical support to the battery unit cells. The housing of the battery pack is conventionally aluminum or stainless steel. Aluminum is lighter weight but is typically more expensive than stainless steel, which is heavier but less expensive.

The battery housings disclosed herein improve upon the conventional aluminum and stainless-steel housings. The battery housings disclosed herein utilize a supercapacitor shell structure to form one or more walls of the battery housing. The supercapacitor shell is as lightweight as aluminum or lighter. The supercapacitor shell provides the mechanical strength required to house the battery unit cells while also providing the thermal management provided by traditional housing materials. The supercapacitor shell also produces power on its own, supplementing the power that is produced by the battery unit cells or providing power when the battery is not providing power.

Figure 1:
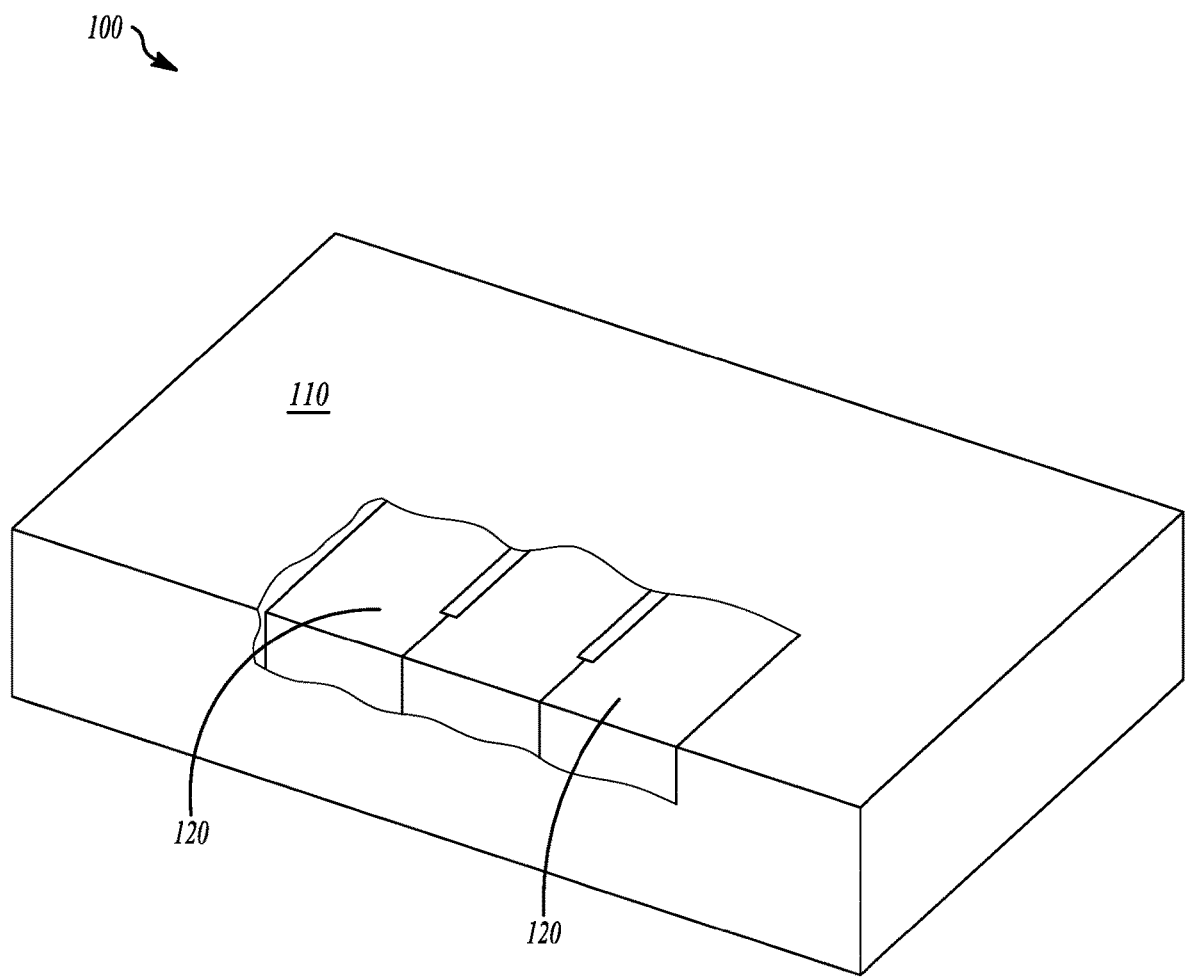
FIG. 1 is a perspective view of a battery pack with a cut-out to show the battery unit cells.

FIG. 1 is a perspective view of a battery pack 100 with a housing 110. The housing 110 in FIG. 1 is illustrated to expose battery cells 120 that are encased in the housing 110. The battery pack 100 is provided as a non-limiting example. The battery pack 100 can house any number of battery cells 120. The number of battery cells 120 may vary based on application. Applications may be electric vehicle applications, hybrid vehicle applications, consumer product applications, and industrial product applications. The battery cells 120 can be stacked as shown, can be aligned on their sides, or can be arranged in any suitable manner within the housing 110. The battery cells 120 can be any type of battery cell appropriate for the application. Non-limiting examples include lithium metal battery cells, lithium ion battery cells, and alkaline battery cells.

Figure 2:
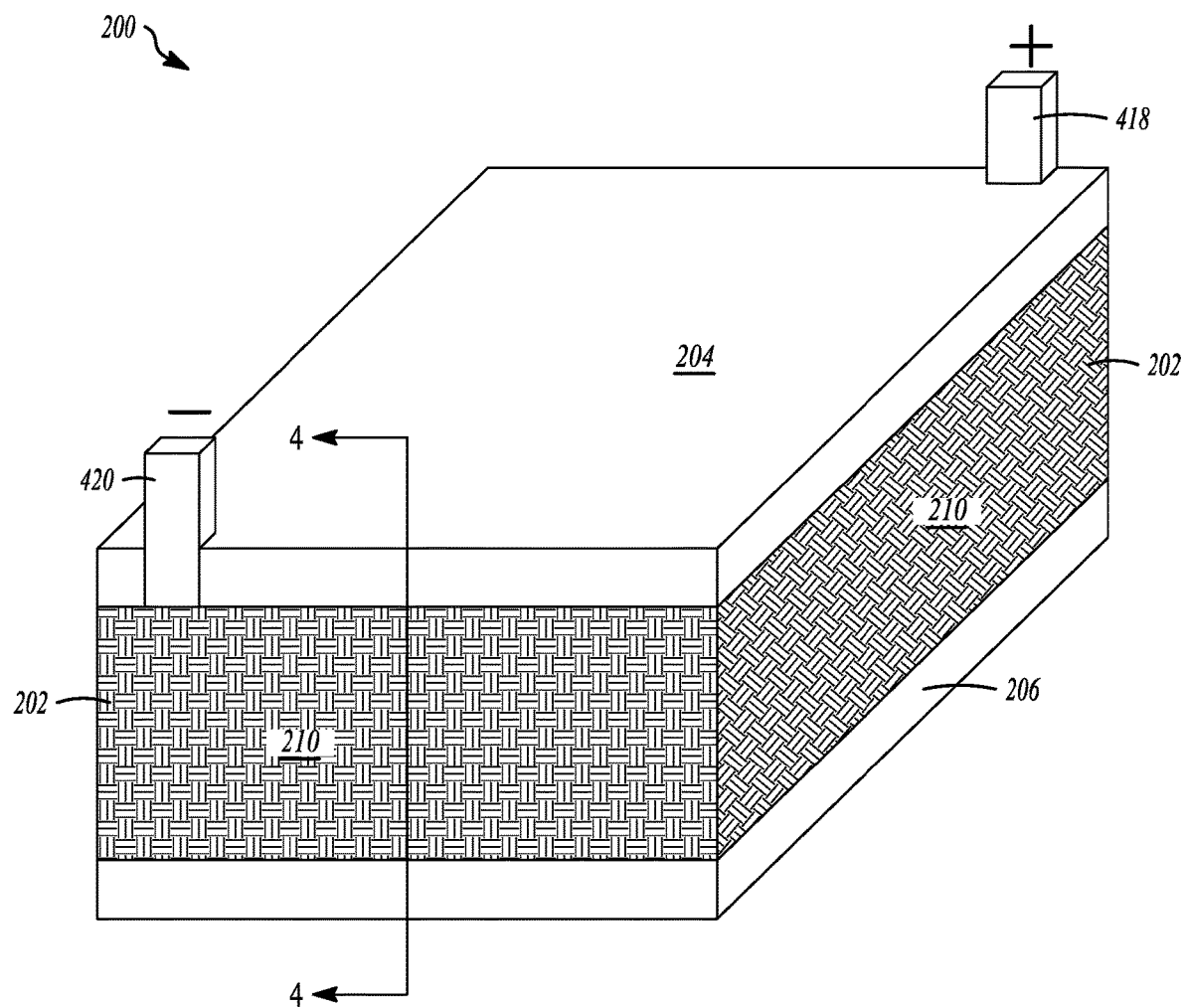
FIG. 2 is a perspective view of a battery pack with an embodiment of a housing having the supercapacitor shell as disclosed herein.

FIG. 2 is a perspective view of an embodiment of a battery housing 200 as disclosed herein. The battery housing 200 is configured to encase multiple battery cells as illustrated in FIG. 1. The battery housing 200 comprises a supercapacitor shell, which will be described in detail with reference to FIG. 4. The battery housing 200 is generally configured as a box having six walls. One or more walls may have contours not illustrated in the figures. Openings may be included in the housing for air flow or wiring that is not shown. The battery housing 200 has four side walls 202, a top wall 204 and a bottom wall 206. As illustrated, the top wall 204 and the bottom wall 206 each have a larger surface area than the side walls 202. These designations are not meant to be limiting. In use, the battery pack may be positioned such that the housing 200 is resting on a side wall 202 or a top wall 204, for example.

Figure 3:
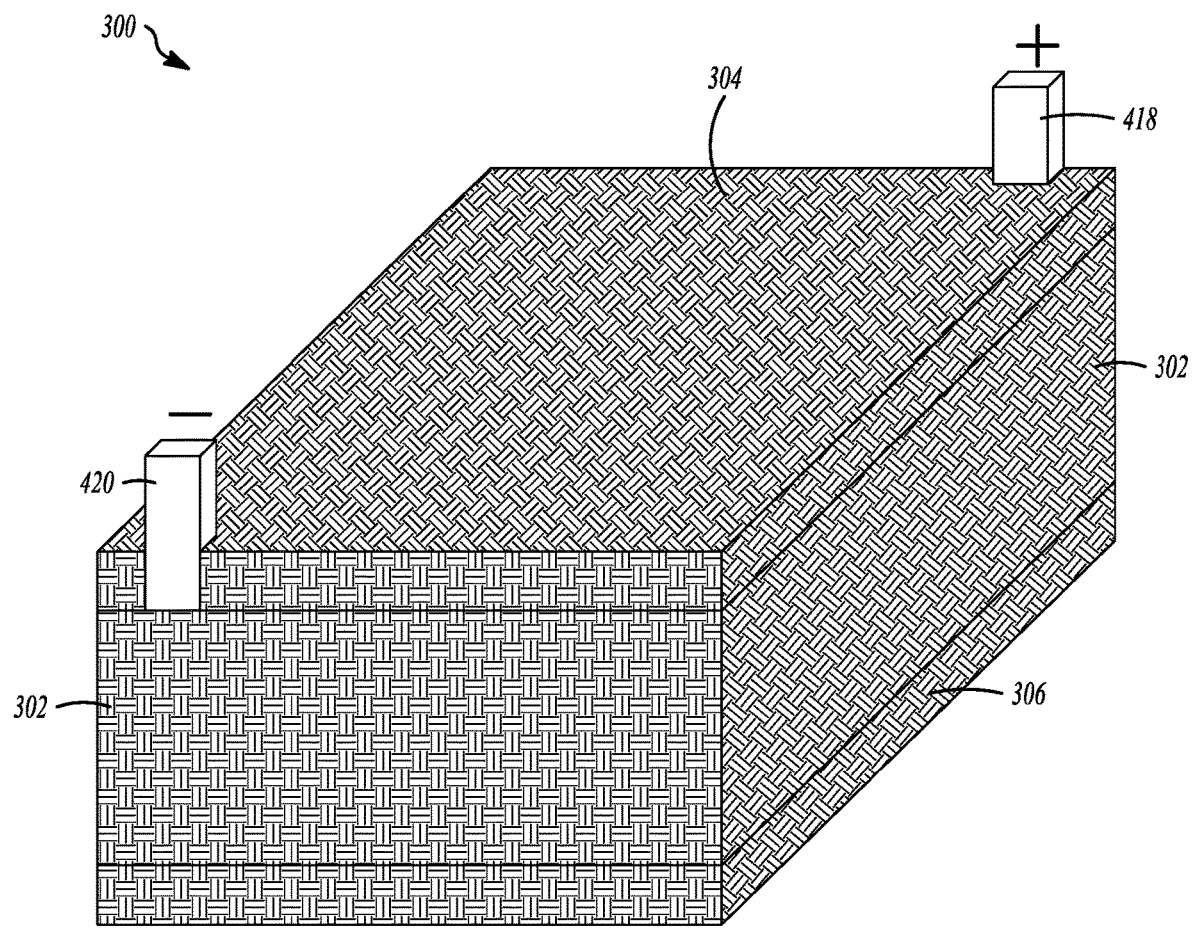
FIG. 3 is a perspective view of a battery pack with another embodiment of a housing having the supercapacitor shell as disclosed herein.

In FIG. 2, the embodiment of the battery housing 200 uses the supercapacitor shell 210 for each of the side walls 202 of the housing 200. In other words, each of the four side walls 202 of the housing 200 is made from the supercapacitor shell structure described with respect to FIG. 4. FIG. 3 is another embodiment of a battery housing 300 in which all four side walls 302, the top wall 304 and the bottom wall 306 are made of the supercapacitor shell structure described with respect to FIG. 4. The embodiments in FIGS. 2 and 3 are not limiting. The disclosure also contemplates battery housings having only one of the six walls made from the supercapacitor shell structure, any two of the six walls made from the supercapacitor shell structure, any three of the six walls made from the supercapacitor shell structure, any four of the six walls made from the supercapacitor shell structure, and any five of the six walls made from the supercapacitor shell structure. Walls that are not made from the supercapacitor shell structure can be aluminum or steel, or any other appropriate material for battery housings known to those skilled in the art.

Figure 4:
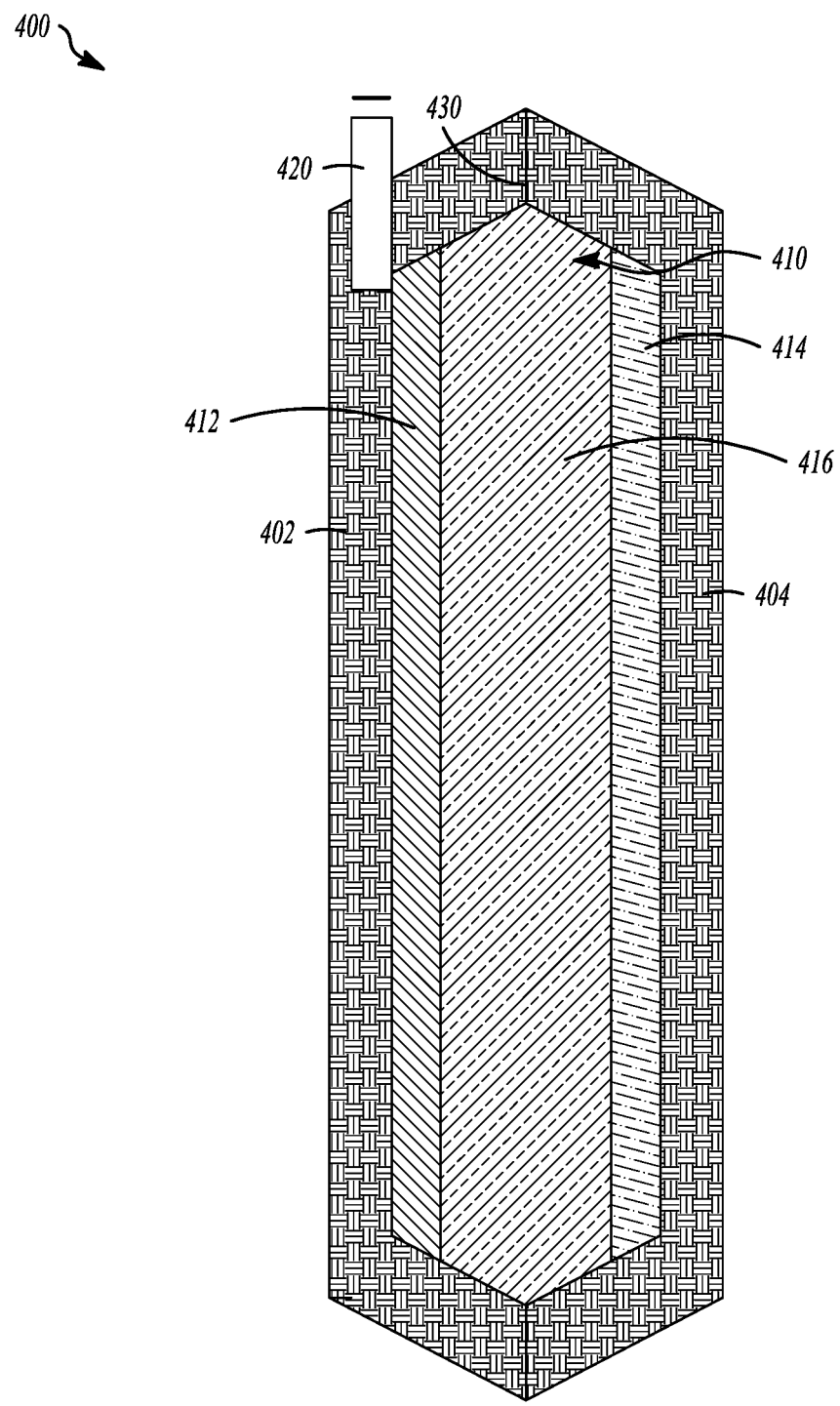
FIG. 4 is a cross-sectional view of the supercapacitor shell as disclosed herein, the supercapacitor shell used as at least one wall of the battery housing.

FIG. 4 is a cross-sectional view of a sidewall 202 made of the supercapacitor shell structure as illustrated in FIG. 2. The supercapacitor shell 400 used to form the one or more walls of the battery housings 200, 300 disclosed herein comprises two layers 402, 404 each of carbon fiber reinforced with plastic. The carbon fiber can be a woven carbon mat, as a non-limiting example. The carbon fiber can be impregnated with glass fiber in some embodiments, providing insulating properties while maintaining the shell's conductivity and maintaining the shell's light weight. The plastic can be epoxy, as a non-limiting example. The plastic can be coated on one or both sides of the carbon fiber, thereby impregnating the carbon fiber. The plastic provides the carbon fiber additional mechanical strength, ease of handling, and insulation.

The two layers 402, 404 of carbon fiber reinforced with plastic sandwich an electrode 410 between the two layers 402, 404. The electrode 410 comprises negative electrode material 412, positive electrode material 414, and an electrolyte 416. A separator or membrane can separate the active materials. As non-limiting examples, the negative electrode material can be graphite, carbon black, a graphene/polyaniline composite, a vanadium pentoxide ($V_2O_5$)/reduced graphene oxide (rGO) hybrid, 3D graphene foam, 3D graphene/molybdenum disulfide ($MoS_2$) composite, a polyaniline/cobalt oxide ($Co_3O_4$) composite, 3D nickel nanoparticle nanosheets, nickel-cobalt sulfide nanoflakes on cobalt oxide, and methylimidazole zinc salt (ZIF8) zeolite/multi-walled carbon nanotube (MWCNT)-derived composites. As non-limiting examples, the positive electrode material can be carbon black, activated carbon, 3D graphene and graphene oxide with additives. As non-limiting examples, the electrolyte can be a liquid, polymer or gel electrolyte such as polyvinyl alcohol (PVA) in sulfuric acid ($H_2SO_4$) and polyacrylamide with sodium sulfate ($Na_2SO_4$).

A positive electrode terminal 418 is connected to the carbon fiber of one of the two layers 402, 404 and a negative electrode terminal 420 is connected to the carbon fiber of another of the two layers 402, 404. As illustrated in FIG. 2, all four side walls 202 of the battery housing 200 is formed of the supercapacitor shell 400. As illustrated in FIG. 2, there is one positive electrode terminal 418 and one negative electrode terminal 420 as each of the four side walls 202 consisting of the supercapacitor material 400 are connected. As illustrated in FIG. 3, there is one positive electrode terminal 418 and one negative electrode terminal 420 as each of the four side walls 302, the top wall 304 and the bottom wall 306 consisting of the supercapacitor shell 400 are connected. However, other embodiments are contemplated. As a non-limiting example, in FIG. 2, each side wall 202 consisting of the supercapacitor shell 400 may be independent, each independent side wall 202 requiring a positive electrode terminal and a negative electrode terminal. As another example, in FIG. 2, two of the side walls 202 of the battery housing 200 may be connected while the other two side walls 202 of the battery housing 200 are connected to each other, requiring that each pair of connected side walls would have a positive electrode terminal and a negative electrode terminal. As used herein, "connected" means that the walls are a continuous supercapacitor shell structure or that the walls are electrically connected, such as through contact of the carbon fiber material of each supercapacitor shell.

The positive electrode terminal 418 and the negative electrode terminal 420 are each connected to the carbon fiber of a respective layer so that there is electrical connection between the carbon fiber and the terminals 418, 420. The positive electrode terminal 418 and the negative electrode terminal 420 can each be connected to the carbon fiber before the carbon fiber is reinforced with the plastic so that the plastic does not obstruct the electrical connection between the terminal and the carbon fiber.

The two layers 402, 404 of carbon fiber enclose the electrode 410 in a configuration similar to a pouch battery cell. Edges 430 of the two layers 402, 404 are laminated together to contain the electrode 410 with the positive electrode terminal 418 and the negative electrode terminal 420 extending external to the laminated edges 430.

The supercapacitor shell 400 that forms one, some or all of the walls of the battery housing 200, 300 is light weight and mechanically robust. The supercapacitor shell 400 is also capable of producing power. The supercapacitor shell 400 uses static electricity rather than chemistry to store energy. The supercapacitor shell 400 is charged from mechanical vibrations, such as vibrations resulting from the operation of an electric or hybrid vehicle, the motion building up positive and negative electrical charges that are stored until discharged. The supercapacitor shell 400 is a high power/low energy device that produces power separate from and in addition to the power produced by the battery cells housed within the battery housing. The supercapacitor shell 400 may provide power while the battery cells housed by the battery housing are also producing power or may provide power when the battery cells housed by the battery housing are off or charging. The battery housings 200, 300 disclosed herein incorporating the supercapacitor shell 400 may eliminate the need for a secondary battery used in applications requiring intermittent high power. The supercapacitor shell 400 weighs less than a secondary batter, generally does not use harmful chemicals or toxic metals, and can be charged and discharged without wearing out. Because the supercapacitor shell 400 cannot store near the same amount of electrical energy as the battery cells housed by the battery housing 200, 300, the supercapacitor shells 400 are not a substitute for the battery cells.

Figure 5:
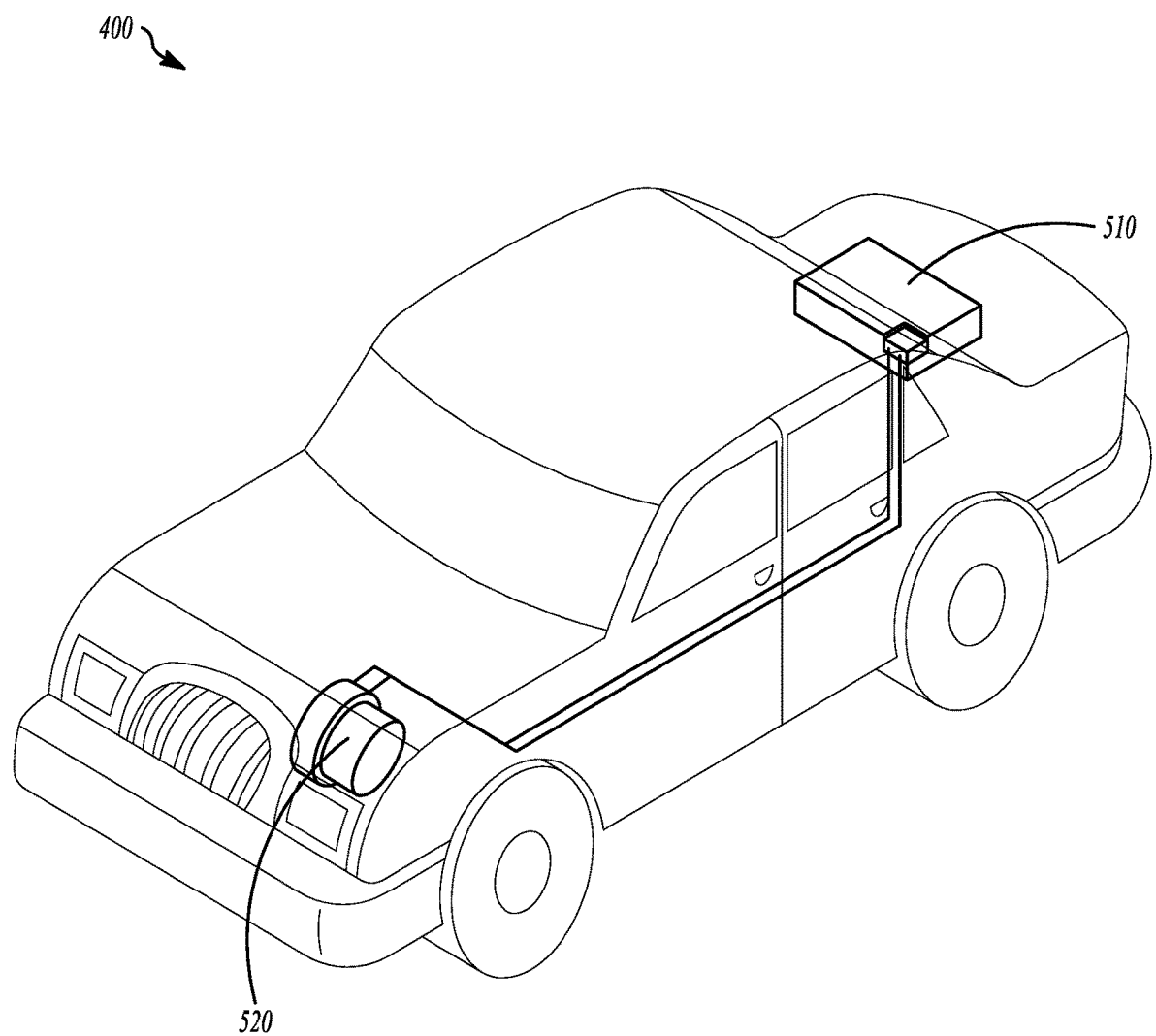
FIG. 5 is a schematic of a vehicle outfitted with a battery pack having a housing with the supercapacitor shell as disclosed herein.

Battery packs using the battery housings 200, 300 disclosed herein can be used in electric or hybrid vehicles, as non-limiting examples. FIG. 5 illustrates a vehicle 500 having a battery pack 510 with a battery housing 200, 300 as disclosed herein. The supercapacitor shell 400 of the battery housing 200, 300 can be used to provide power to a component of the vehicle 500. The positive electrode terminal 418 and the negative electrode terminal 420 of the supercapacitor shell 400 can be connected to a load, represented by an electric motor 520 in FIG. 5. The power from the supercapacitor shell 400 can be provided to supplement the power from the battery cells of the battery pack when the vehicle 500 is under acceleration. Hybrid vehicles, for example, may supplement battery power with power from a gas engine when a certain amount of acceleration is called for, such as the additional acceleration needed when going uphill. The supercapacitor shell 400, providing high power and quick discharge, may supplement the battery power in such a situation, relieving the need for the supplemental power from the gas engine. The use of the supercapacitor shell 400 in other high power/quick discharge applications is also contemplated herein. Other non-limiting examples of applications for the supercapacitor shell power generation include regenerative braking and power steering.

Figure 6:
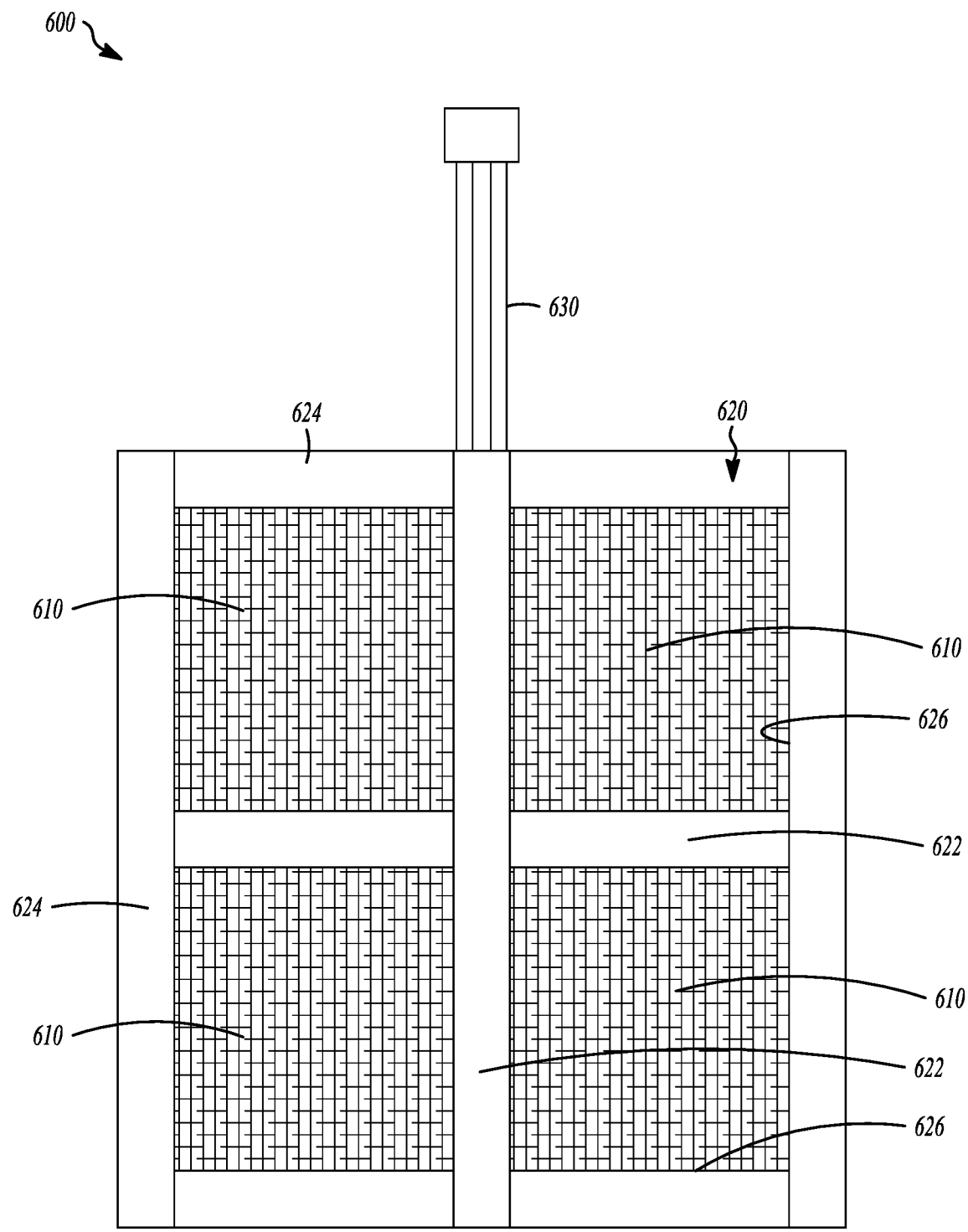
FIG. 6 is a plan view of a battery pack assembly having a frame enclosing multiple battery packs as disclosed herein.

Certain applications may call for multiple battery packs. Disclosed herein is a battery pack assembly 600 shown in plan view in FIG. 6. The battery pack assembly 600 comprises multiple battery packs 610 as disclosed herein having a battery housing 200, 300 that incorporates the supercapacitor shell 400. A frame 620 is configured to hold the multiple battery packs 610. The frame 620 can be made of metal, such as aluminum. The frame 620 comprises internal supports 622 between adjacent battery packs 610 and external supports 624 connected the internal supports 622 and configured to surround the multiple battery packs 610 along exterior side walls 626 of the multiple battery packs 610. The frame 620 does not have a top cover or a bottom cover, enclosing just all four sides of each battery pack. This keeps the frame 620 lightweight and provides air flow across the battery packs 610. Alternatively, the frame 620 may be configured with one or both of a top support and a bottom support for the battery packs 610. The top support and/or bottom support may have openings in any configuration to reduce weight and provide air flow. As yet another alternative, the internal supports 622 and external supports 624 may have a flange extending from a lower edge sufficient to support the battery packs 610. The frame 620 can be configured to enclose the battery packs 610 in a single row or in multiple rows are illustrated in FIG. 6. The frame 620 can further be configured to stack battery packs 610, providing spacing for air flow between the battery packs 610.

The battery pack assembly 600 in FIG. 6 has four battery packs 610 as an illustration. Any number of two or more battery packs can form the battery pack assembly 600 as desired or required. The power capability of each battery housing supercapacitor shell can be harnessed to power a particular load. Wiring 630 connected to the positive electrode terminal and the negative electrode terminal of each battery pack 610 are consolidated, with the wiring supported by the frame 620 until the wiring extends external to the frame 620. The wiring 630 from individual supercapacitor shells and battery packs can be further consolidated into a single wire through which all supercapacitor power is run to the load to be powered.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A battery pack, comprising:
multiple battery cells; and
a housing encasing the battery cells, the housing comprising six walls, at least one wall formed of a supercapacitor shell comprising:
two layers each of carbon fiber reinforced with plastic;
an electrode between the two layers, the electrode comprising:
negative electrode material;
positive electrode material; and
an electrolyte;
a positive electrode terminal connected to the carbon fiber of one of the two layers; and
a negative electrode terminal connected to the carbon fiber of another of the two layers, wherein edges of the two layers are laminated together to contain the electrode with the positive electrode terminal and the negative electrode terminal extending external to the laminated edges.

2. The battery pack of claim 1, wherein the carbon fiber reinforced with plastic is formed of a woven carbon mat coated with epoxy.

3. The battery pack of claim 1, wherein the supercapacitor shell is configured to generate power that is transmitted through the positive electrode terminal and the negative electrode terminal to a load.

4. The battery pack of claim 3, wherein the load is a vehicle component.

5. The battery pack of claim 4, wherein the vehicle component is a regenerative brake.

6. The battery pack of claim 4, wherein the vehicle component is an electric motor.

7. The battery pack of claim 1, wherein the carbon fiber is impregnated with glass fiber.

8. The battery pack of claim 1, wherein the at least one wall is four walls, the four walls being side walls of the housing.

9. The battery pack of claim 1, wherein the at least one wall is two walls forming top and bottom surfaces of the housing.

10. The battery pack of claim 1, wherein the at least one wall is the six walls of the housing.

11. A battery pack assembly, comprising:
multiple battery packs, each battery pack as claimed in claim 1;
a frame configured to hold the multiple battery packs, the frame comprising:
  internal supports between adjacent battery packs; and
  external supports connected the internal supports and configured to surround the multiple battery packs along exterior side walls of the multiple battery packs; and
wiring connected to the positive electrode terminal and the negative electrode terminal of each battery pack to consolidate power generated by each battery pack, the wiring supported by the frame.

12. The battery pack assembly of claim 11, wherein the frame is aluminum and is further configured to expose a top surface and a bottom surface of each battery pack.

13. A battery housing configured to encase multiple battery cells, the battery housing comprising a supercapacitor shell comprising:
two layers each of carbon fiber reinforced with plastic;
an electrode between the two layers, the electrode comprising:
  negative electrode material;
  positive electrode material; and
  an electrolyte;
a positive electrode terminal connected to the carbon fiber of one of the two layers; and
a negative electrode terminal connected to the carbon fiber of another of the two layers, wherein edges of the two layers are laminated together to contain the electrode with the positive electrode terminal and the negative electrode terminal extending external to the laminated edges.

14. The battery housing of claim 13, wherein the carbon fiber is a woven carbon mat impregnated with epoxy as the plastic.

15. The battery housing of claim 13, wherein at least one wall of the battery housing is formed of the supercapacitor shell.

16. The battery housing of claim 13, wherein each of four side walls of the battery housing is formed of the supercapacitor shell.

17. The battery housing of claim 13, wherein all walls of the battery housing are formed of the supercapacitor shell.

18. The battery housing of claim 13, wherein the supercapacitor shell is configured to generate power that is transmitted through the positive electrode terminal and the negative electrode terminal to a load.

19. The battery housing of claim 13, wherein the load is a vehicle component.

20. The battery housing of claim 13, wherein the carbon fiber is impregnated with glass fiber.

* * * * *